(12) United States Patent
Irisawa

(10) Patent No.: US 8,322,932 B2
(45) Date of Patent: Dec. 4, 2012

(54) COUPLING DEVICE AND OPTICAL IMAGING DEVICE

(75) Inventor: Yuichiro Irisawa, Ashigarakami-gun (JP)

(73) Assignee: Terumo Kabushiki Kaisha, Shibuya-Ku, Tokyo (JP)

( * ) Notice: Subject to any disclaimer, the term of this patent is extended or adjusted under 35 U.S.C. 154(b) by 163 days.

(21) Appl. No.: 12/973,245

(22) Filed: Dec. 20, 2010

(65) Prior Publication Data

US 2012/0002928 A1    Jan. 5, 2012

Related U.S. Application Data

(63) Continuation of application No. PCT/JP2009/060518, filed on Jun. 9, 2009.

(30) Foreign Application Priority Data

Jun. 20, 2008 (JP) .................. 2008-161062

(51) Int. Cl.
*G02B 6/38* (2006.01)
(52) U.S. Cl. .............. 385/83; 385/66; 385/84
(58) Field of Classification Search .......... 385/53, 385/55, 66, 83, 84
See application file for complete search history.

(56) References Cited

U.S. PATENT DOCUMENTS

| 4,898,446 A * | 2/1990 | Hinckley .................. 385/72 |
| 5,481,634 A | 1/1996 | Anderson et al. |
| 7,346,256 B2 * | 3/2008 | Marrs et al. ................ 385/137 |
| 7,740,408 B2 | 6/2010 | Irisawa |
| 2009/0196554 A1 | 8/2009 | Irisawa |

FOREIGN PATENT DOCUMENTS

| JP | 4-70608 U | 6/1992 |
| JP | 4-91315 U | 8/1992 |
| JP | 8-327855 A | 12/1996 |
| JP | 4037538 B2 | 11/2007 |
| WO | WO98/23984 A1 | 6/1998 |
| WO | WO 03/088826 A1 | 10/2003 |
| WO | WO 2008/023741 A1 | 2/2008 |

OTHER PUBLICATIONS

International Search Report (PCT/ISA/210) issued on Jul. 7, 2009, by Japanese Patent Office as the International Searching Authority for International Application No. PCT/JP2009/060518.

* cited by examiner

*Primary Examiner* — Daniel Petkovsek
(74) *Attorney, Agent, or Firm* — Buchanan Ingersoll & Rooney PC

(57) ABSTRACT

A coupling device for coupling optical fiber cables reduces contact with the internal parts when coupling a connector. The coupling device includes a projection of a connector device housing insertable into a groove of an adapter device groove of an adapter device housing. The coupling device which connects optical fiber cables compresses an elastic member, and connects an optical fiber connector of the connector device and the optical fiber end on the adapter device side.

14 Claims, 16 Drawing Sheets (a)

(b)

(a)

(b)

COUPLING DEVICE AND OPTICAL IMAGING DEVICE

This application is a continuation of International Application No. PCT/JP2009/060518 filed on Jun. 9, 2009, and claims priority to Japanese Application No. 2008-161062 filed on Jun. 20, 2008, the entire content of both of which is incorporated herein by reference.

TECHNICAL FIELD

The present invention generally pertains to optical fiber cables. More specifically, the invention relates to a coupling device for coupling optical fiber cables and to component members of the coupling device.

BACKGROUND DISCUSSION

The relatively recent progress in large-capacity communication and the like has resulted in increasing demand in communication and related fields for optical fiber connectors as a coupling device for coupling of optical fiber cables. Specific examples of the optical fiber connector include FC connector, SC connector, and MU connector.

These connectors are each provided with a mechanism for avoiding relative turning of optical fiber cables to prevent damage from occurring between ends (contact surfaces) of the optical fiber cables connected to each other. For instance, in the case of an FC connector, turning in the circumferential direction is obviated by a pin and a groove, and in the cases of an SC connector and an MU connector, turning in the circumferential direction is avoided by utilizing the shapes of connectors. Examples are disclosed in JP-T-2005-533533 and JP-T-2001-507251.

The above-mentioned mechanisms make it necessary for the user to perform alignment in the circumferential direction at the time of coupling the connectors. Especially, in the case of APC type connectors in which an inclination angle is provided at ends of optical fiber cables for the purpose of suppressing reflection noise, an example of which is shown in International Application Publication No. WO/2008/023741, alignment with higher accuracy is demanded.

In the medical field in recent years, there have been more and more medical devices based on the use of light, such as optical coherence tomography system (OCT). Japanese Patent No. 4037538 discloses an example. These devices utilize light as a signal, and optical fiber cables are used for transmission of signals. Therefore, the use of optical fiber connectors for coupling of optical fiber cables is indispensable in this field.

However, in the coupling device involving rotation of optical fiber as described in Japanese Patent No. 4037538, at the time of coupling the optical fiber cables, an optical fiber to be rotated on the inside is connected while gripping a non-rotated housing on the outside. At the time of coupling, therefore, a compressive load is exerted on a bearing or O-ring at the time of coupling, possibly leading to breakage. In a situation where play for rotation is provided between a housing on the outside and a rotatable element in the inside as described in International Application Publication No. WO/2008/023741, there is an undesirable possibility that thorough coupling of connectors inside might not be completed even after the housings are connected. Besides, in the case where the bearing is a disk-shaped flange, there is a possibility of such an inconvenience as deformation due to friction, arising from the contact of the rotating flange with non-rotated parts.

SUMMARY

According to one aspect, an optical imaging device comprises an optical probe having an optical fiber rotatably incorporated in the optical probe, a controller which has a light source and which sends and receives a signal to and from the optical probe, and a coupling device connecting the optical probe and the controller to each other. The coupling device comprises an adapter device and a connector device. The adapter device includes a first fixing member and a first coupling terminal disposed inside the first fixing member, with the first fixing member having a hollow part opened at one end. The connector device includes a second fixing member and a second coupling terminal disposed inside the second fixing member, with the second terminal being connected to the optical fiber. The second fixing member is insertable into the first fixing member to couple together the first coupling terminal and the second coupling terminal, and the second fixing member possesses an outer wall slidable along an inner wall of the first fixing member when the second fixing member is inserted into the first fixing member. The adapter device also includes a housing provided with at least one curved groove, and the connector device also includes a housing provided with at least one projection. An elastic member is in the second fixing member on a proximal end side of the second fixing member. The groove possesses a shape which, when the second fixing member is inserted into the first fixing member in an insertion direction and the projection enters the groove, causes the projection to slide along the groove until reaching a stopped position in which movement of the projection is stopped following movement of the projection in a direction reverse to the insertion direction, with the first coupling terminal and the second coupling terminal connected to each other when the projection reaches the stopped position.

According to another aspect, an optical fiber coupling device comprises a first optical fiber, a first housing surrounding a first fixing member, with the first fixing member possessing an inner wall surface surrounding a first coupling terminal and possessing a hollow part open at one end, the first optical fiber being connected to first coupling terminal, a second optical fiber, and a second housing surrounding a second fixing member, with the second housing possessing an outer wall surface. The second fixing member is insertable into the first fixing member, and the second fixing member surrounds a second coupling terminal. The outer wall surface of the second fixing member is slidable along the inner wall surface of the first fixing member when the second fixing member is inserted into the first fixing member. The second optical fiber is connected to the second coupling terminal. The first housing includes at least one curved groove which is open at a groove inlet at one end of the first housing, and the second housing includes at least one projection extending outwardly from the outer wall surface of the second housing. An elastic member is positioned in the second housing proximally of the second fixing member, and the groove receives the projection on the outer wall surface of the second housing by way of the groove inlet when the second fixing member is moved in an insertion direction and is inserted into the first fixing member. The groove possesses a configuration that guides the projection when the second fixing member is further moved in the insertion direction so the projection moves in the insertion direction, subsequently moves in a direction reverse to the insertion direction after the projection reaches a deepest part of the groove, and subsequently stops at a stopped position when the projection reaches a terminal end of the groove, whereby the first coupling terminal and the second coupling terminal are connected to each other when the projection reaches the terminal end of the groove. The elastic member is configured so that the elastic member is compressed when the projection is positioned between the groove inlet and the deepest part of the groove.

Another aspect of the disclosure here includes a coupling device comprising an adapter device and a connector device, wherein the adapter device includes a first fixing member and a first coupling terminal disposed inside the first fixing member, and with the connector device including a second fixing member and a second coupling terminal disposed inside the second fixing member. The second fixing member is insertable into the first fixing member to couple together the first coupling terminal and the second coupling terminal, and the second fixing member possesses an outer wall slidable along an inner wall of the first fixing member when the second fixing member is inserted into the first fixing member. The adapter device also includes a housing provided with at least one curved groove, and the connector device also includes a housing provided with at least one projection. An elastic member is in the second fixing member on a proximal end side of the second fixing member. The groove possesses a shape which, when the second fixing member is inserted into the first fixing member in an insertion direction and the projection enters the groove, causes the projection to slide along the groove until reaching a stopped position in which movement of the projection is stopped following movement of the projection in a direction reverse to the insertion direction, with the first coupling terminal and the second coupling terminal connected to each other when the projection reaches the stopped position.

The coupling device disclosed here couples optical fiber cables so that contact between inside members at the time of coupling the connectors is reduced and coupling can be carried out relatively easily. Parts are thus not damaged at the time of coupling because contact between inside members at the time of internal drive after the coupling is reduced, and coupling is performed quite reliably.

BRIEF DESCRIPTION OF THE DRAWING FIGURES

Figure 7:
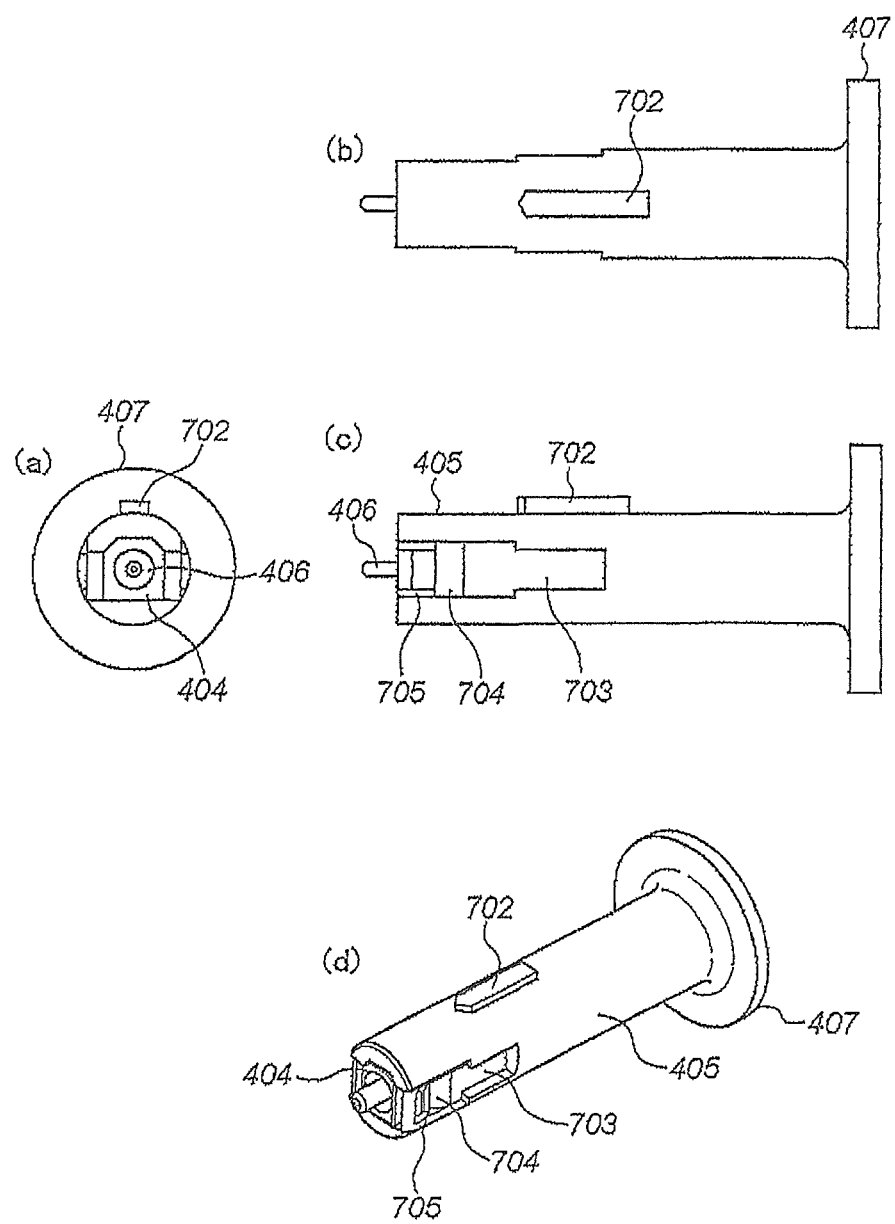

FIGS. 7(*a*)-7(*d*) are views illustrating the connector device.

Figure 8:
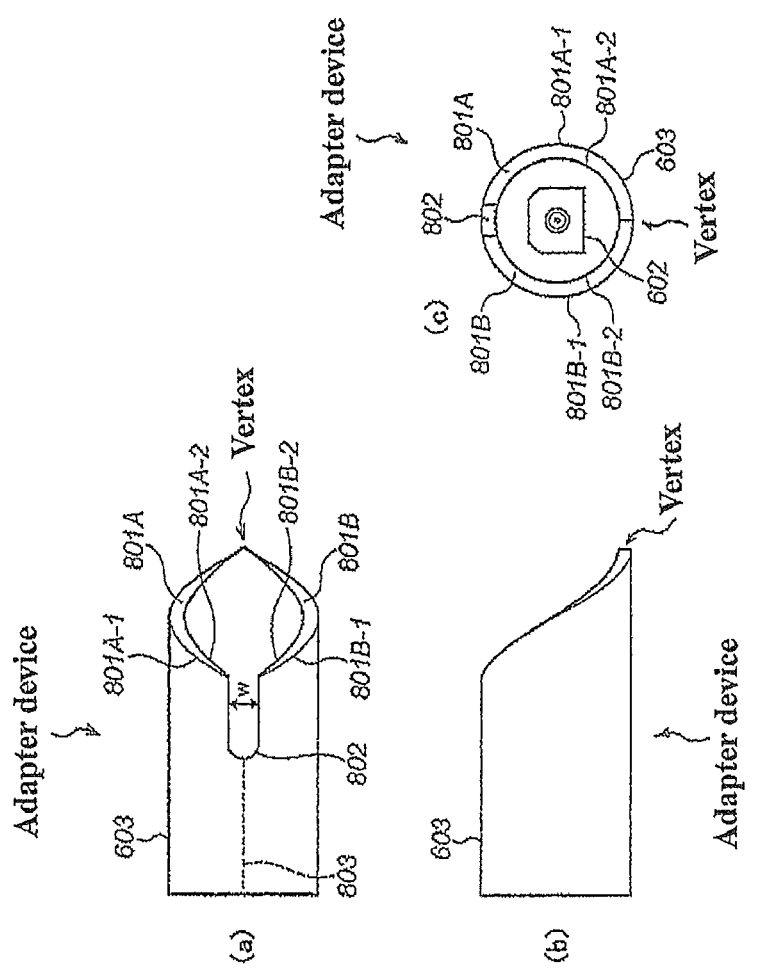

FIGS. 8(*a*)-8(*c*) are views illustrating the adapter device.

Figure 9:
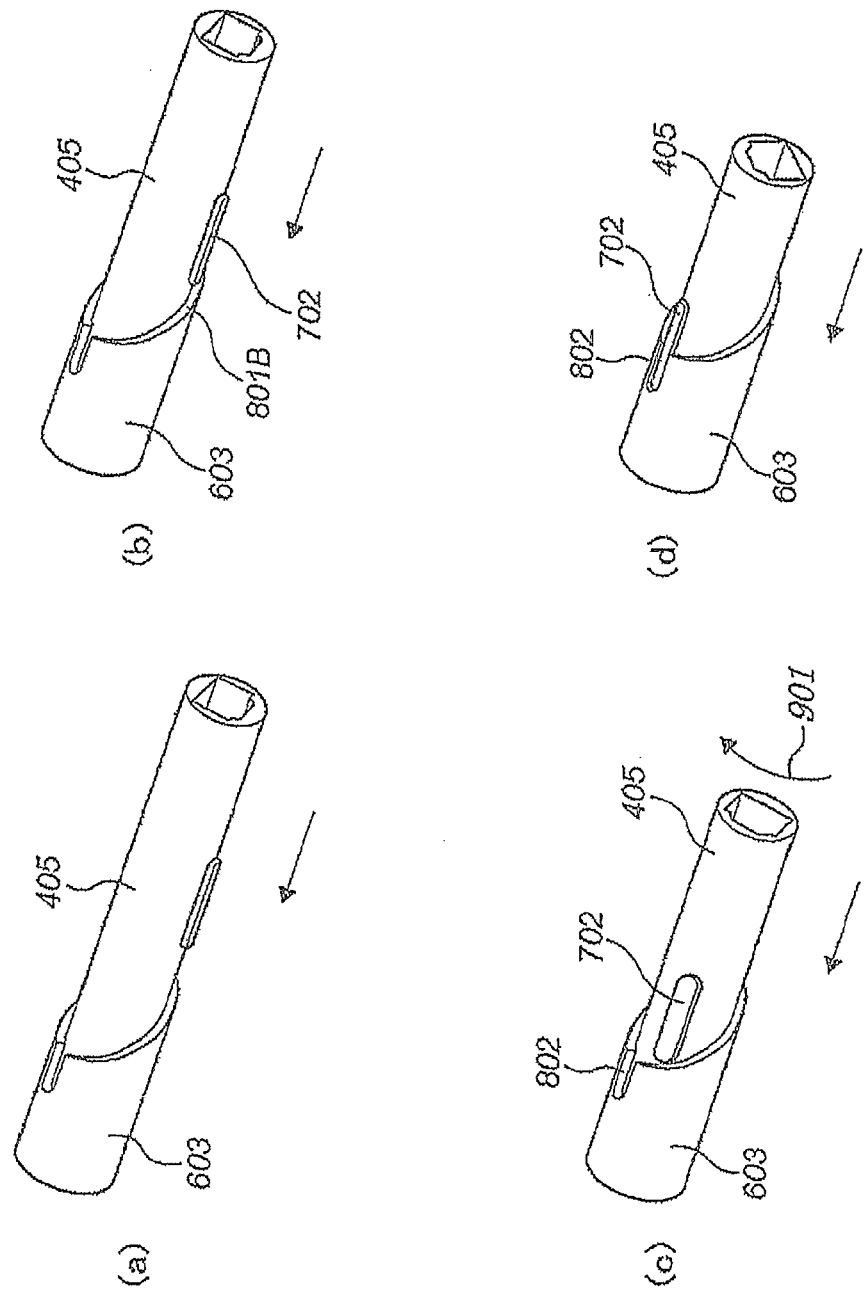

FIGS. 9(*a*)-9(*c*) illustrate operations of the connector fixing member and the adapter fixing member during coupling of the coupling devices.

Figure 10:
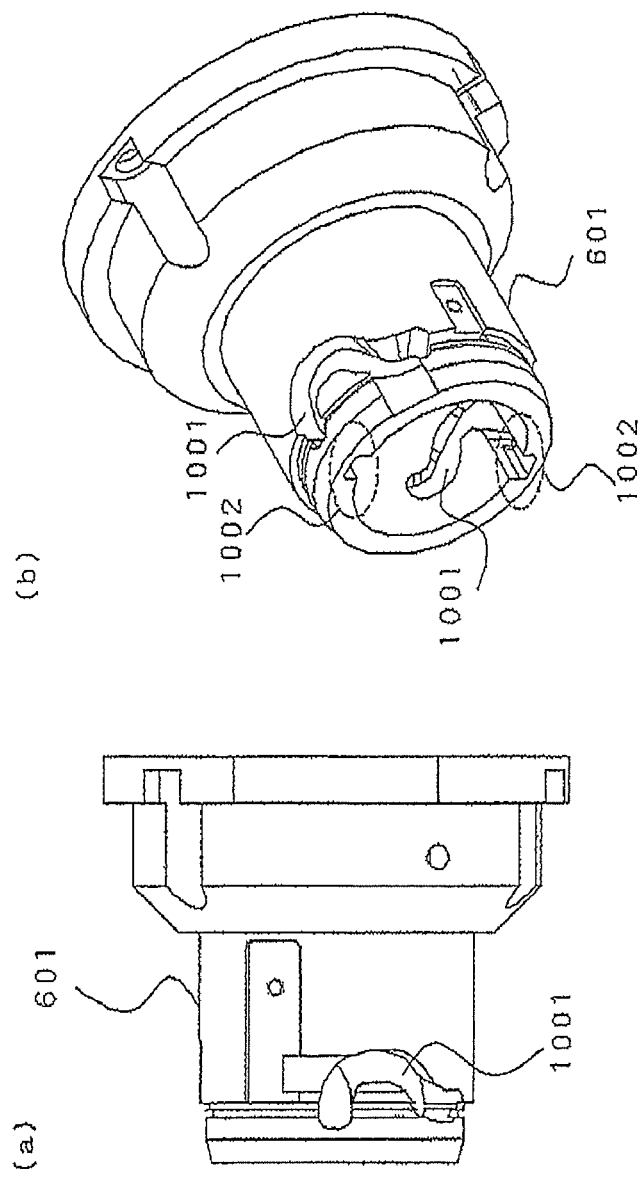

FIG. 10(*a*) is a side view of the adapter device housing, and FIG. 10(*b*) is a perspective view of the adapter device housing.

Figure 11:
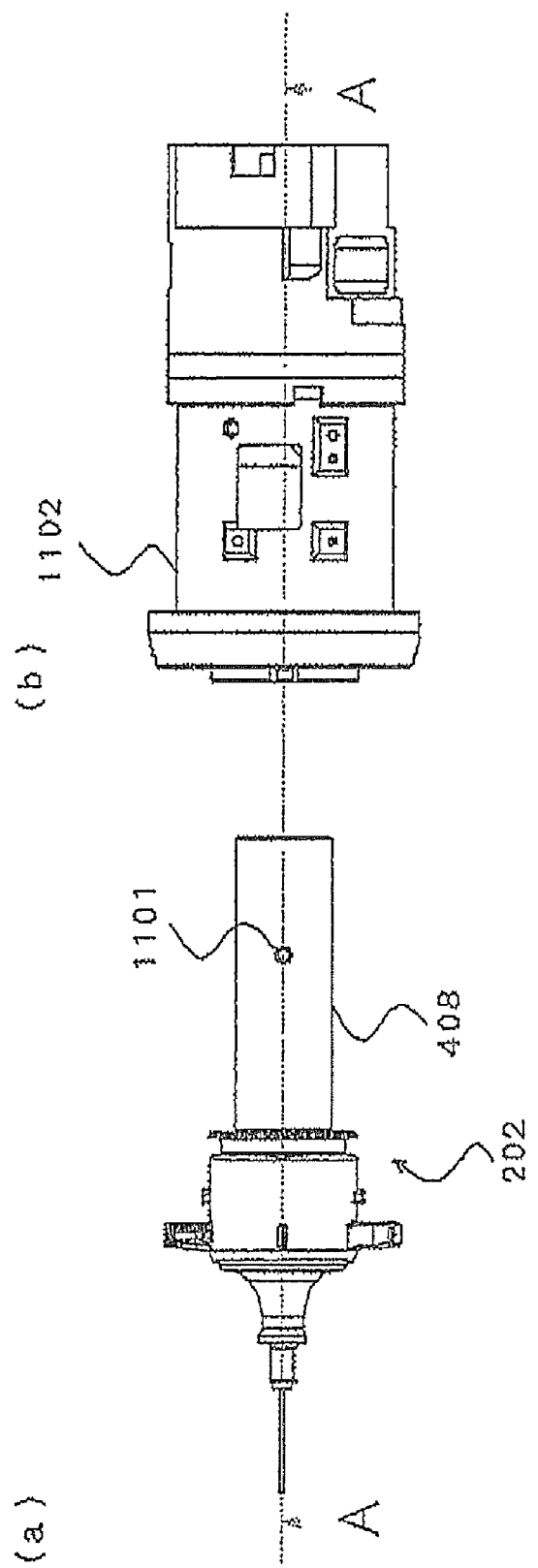

FIG. 11(*a*) is a side view of the connector device, and FIG. 11(*b*) is a side view of the adapter device.

Figure 12:
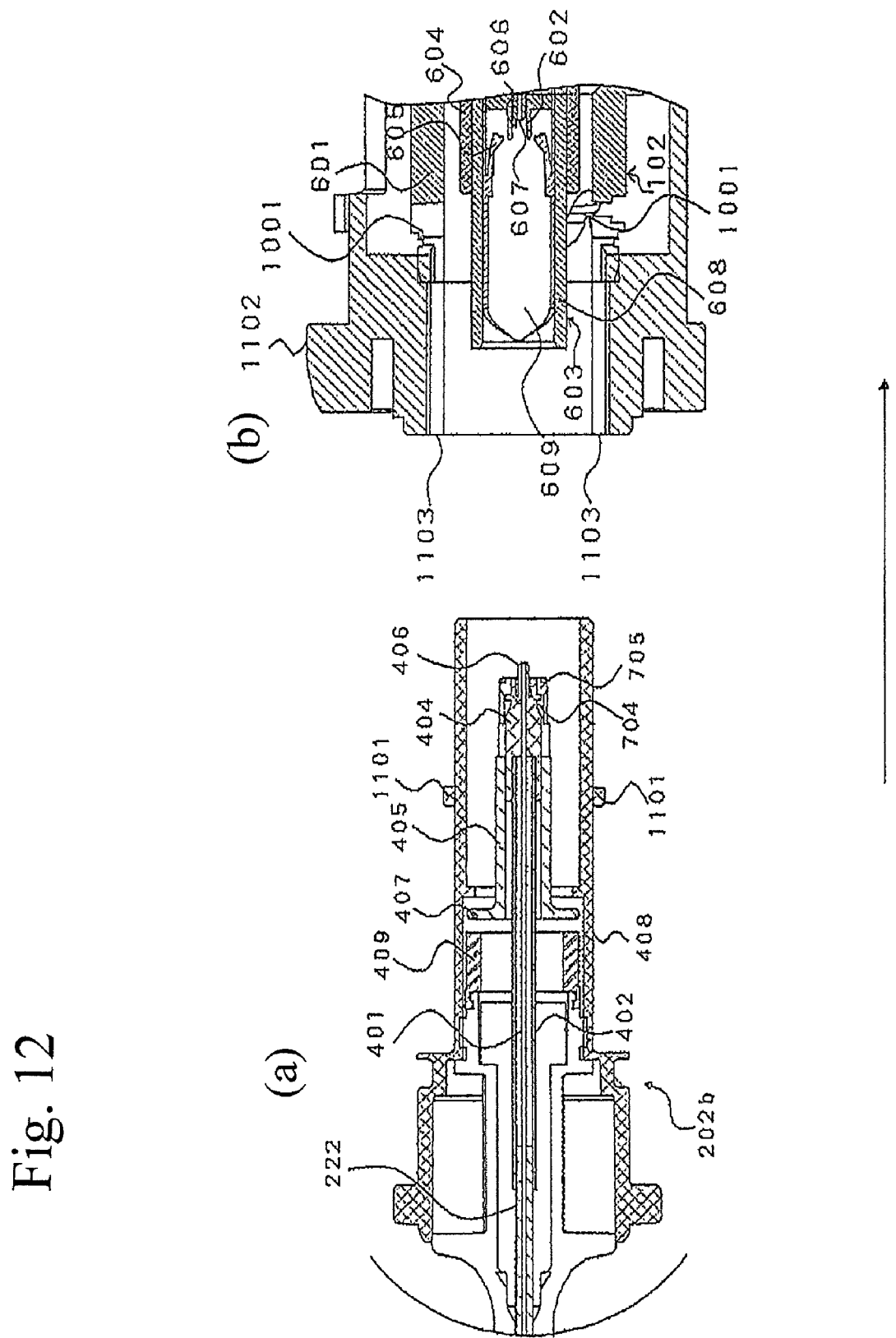

FIGS. 12(*a*) and 12(*b*) are cross-sectional views of the connector device and the adapter device shown in FIG. 11.

Figure 13:
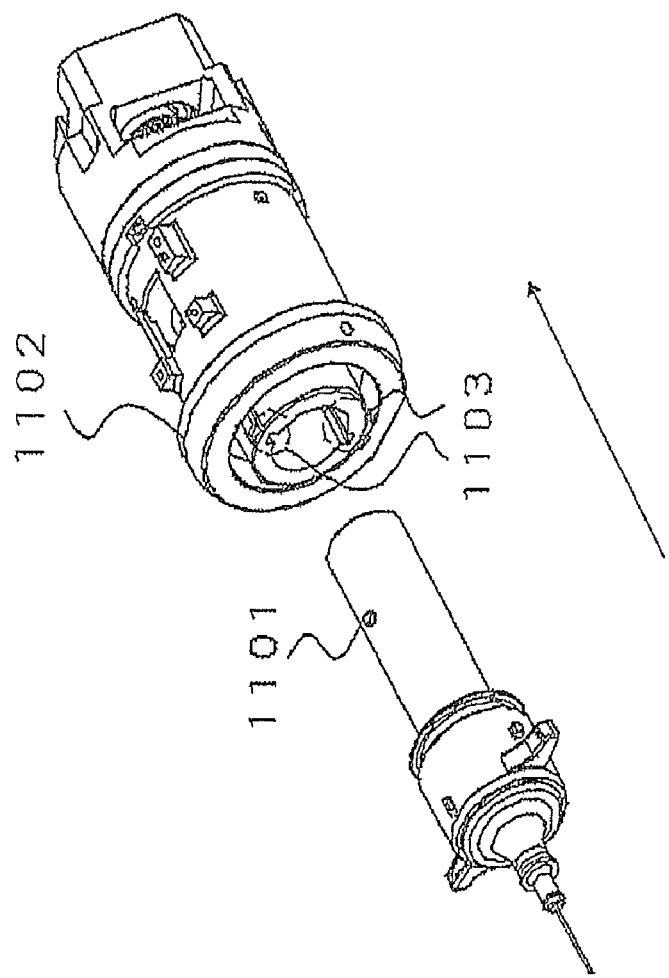

FIG. 13 is a perspective view of the connector device and the adapter device.

Figure 14:
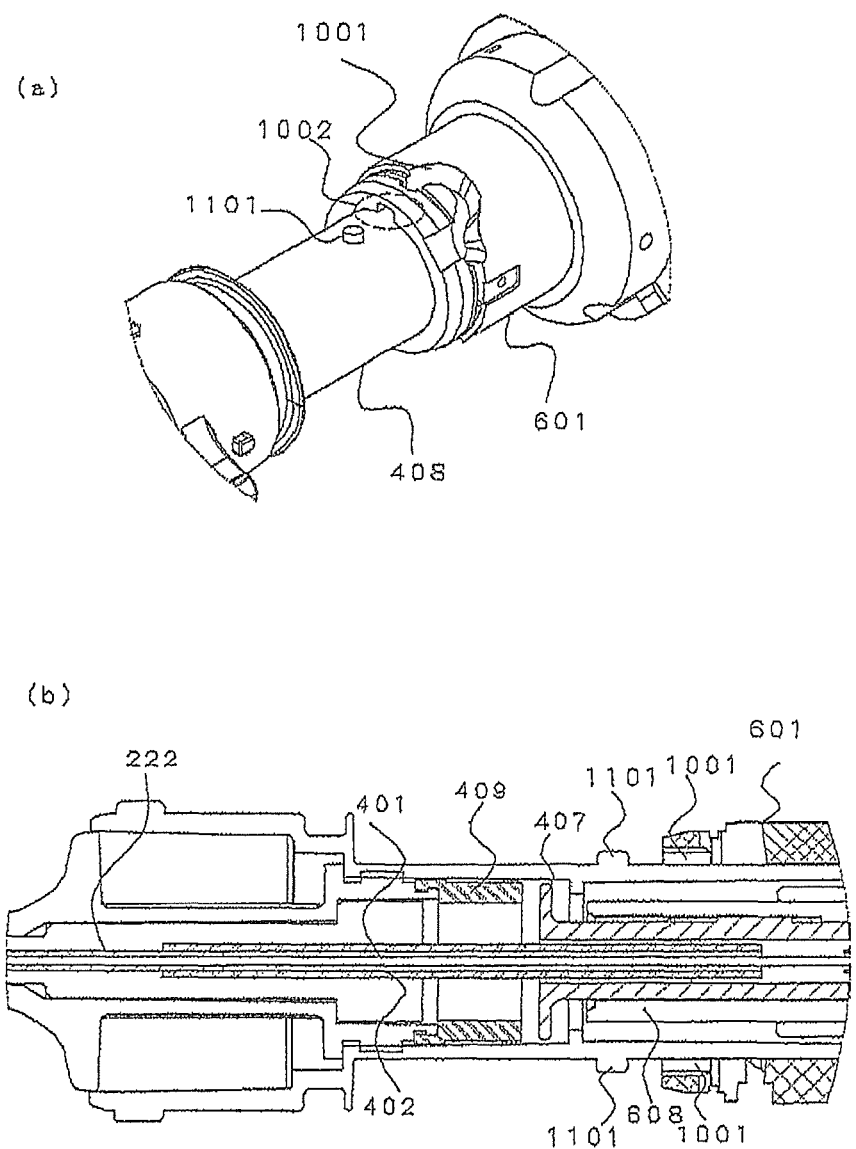

FIGS. 14(*a*) and 14(*b*) illustrate the elastic member and the housing fitting portion before coupling optical fibers.

Figure 15:
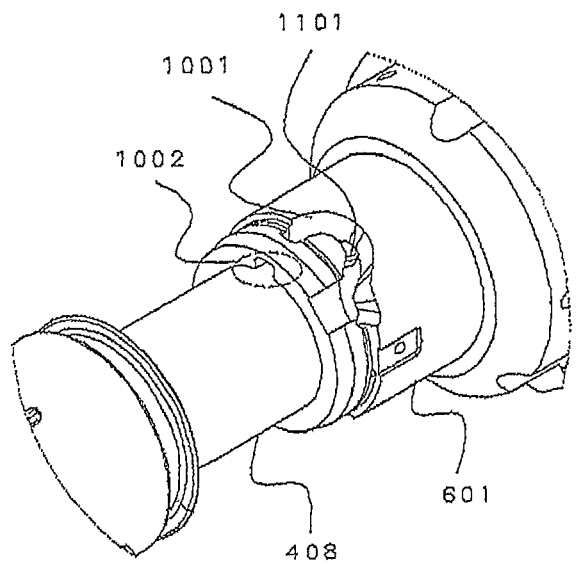
Figure 15:
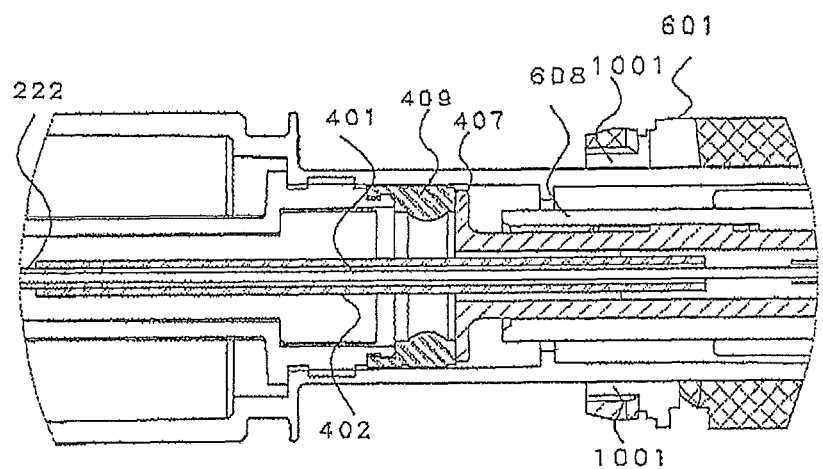

FIGS. 15(*a*) and 15(*b*) illustrate the elastic member and the housing fitting portion at the time of coupling optical fibers.

Figure 16:
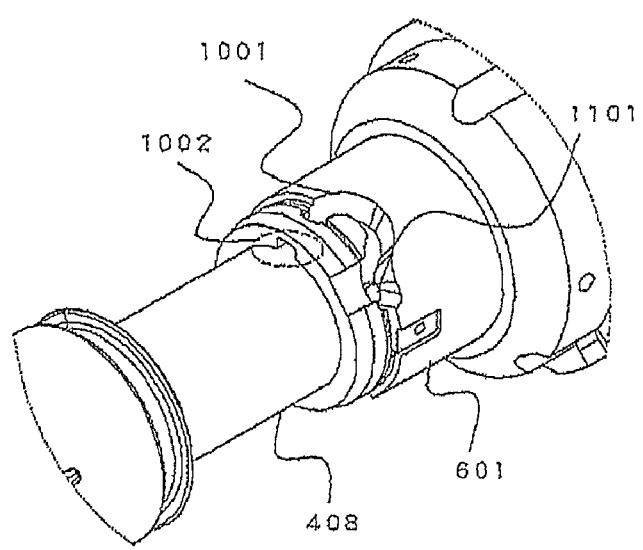
Figure 16:
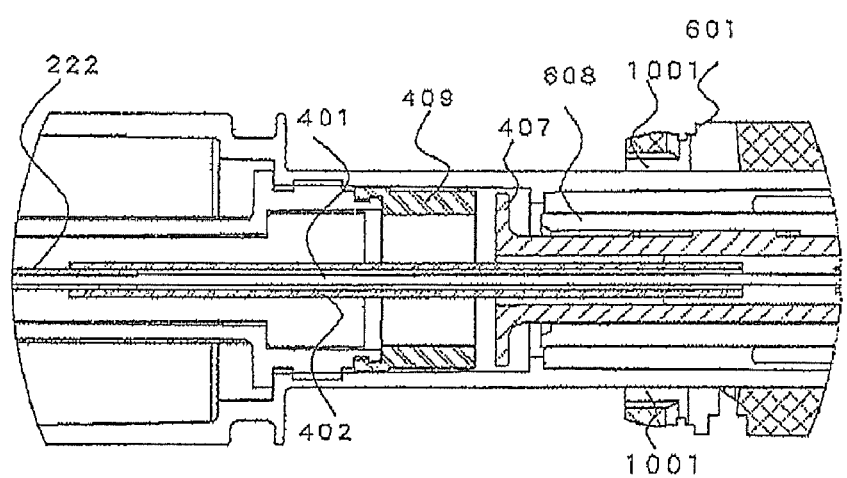

FIGS. 16(*a*) and 16(*b*) illustrate the elastic member and the housing fitting portion after coupling optical fibers.

Figure 17:
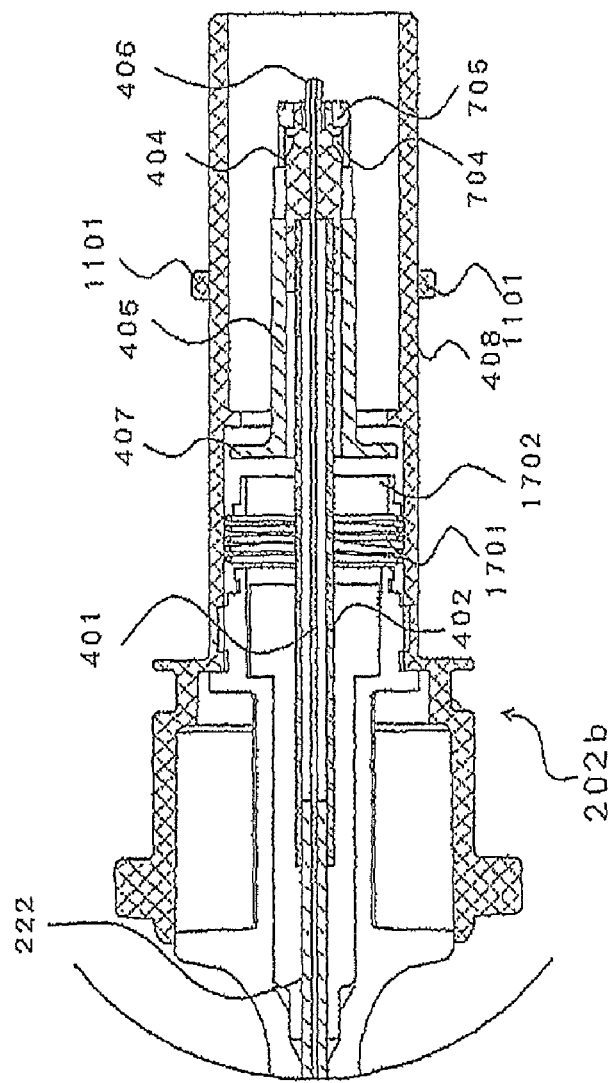

FIG. 17 illustrates a second embodiment of the connector device disclosed here.

DETAILED DESCRIPTION

Set forth below is a detailed description of the coupling device and optical imaging device disclosed here. The following description describes an example in which the coupling device is applied to an optical coherence tomography system (OCT) which is a kind of optical imaging device, but the disclosure here is not limited in this regard as it may be applied to other medical devices in which a coupling device has useful application. Naturally, the disclosure here may also be sued in devices other than medical devices.

EXAMPLE 1

1. General Features of Optical Coherence Tomography System

Figure 1:
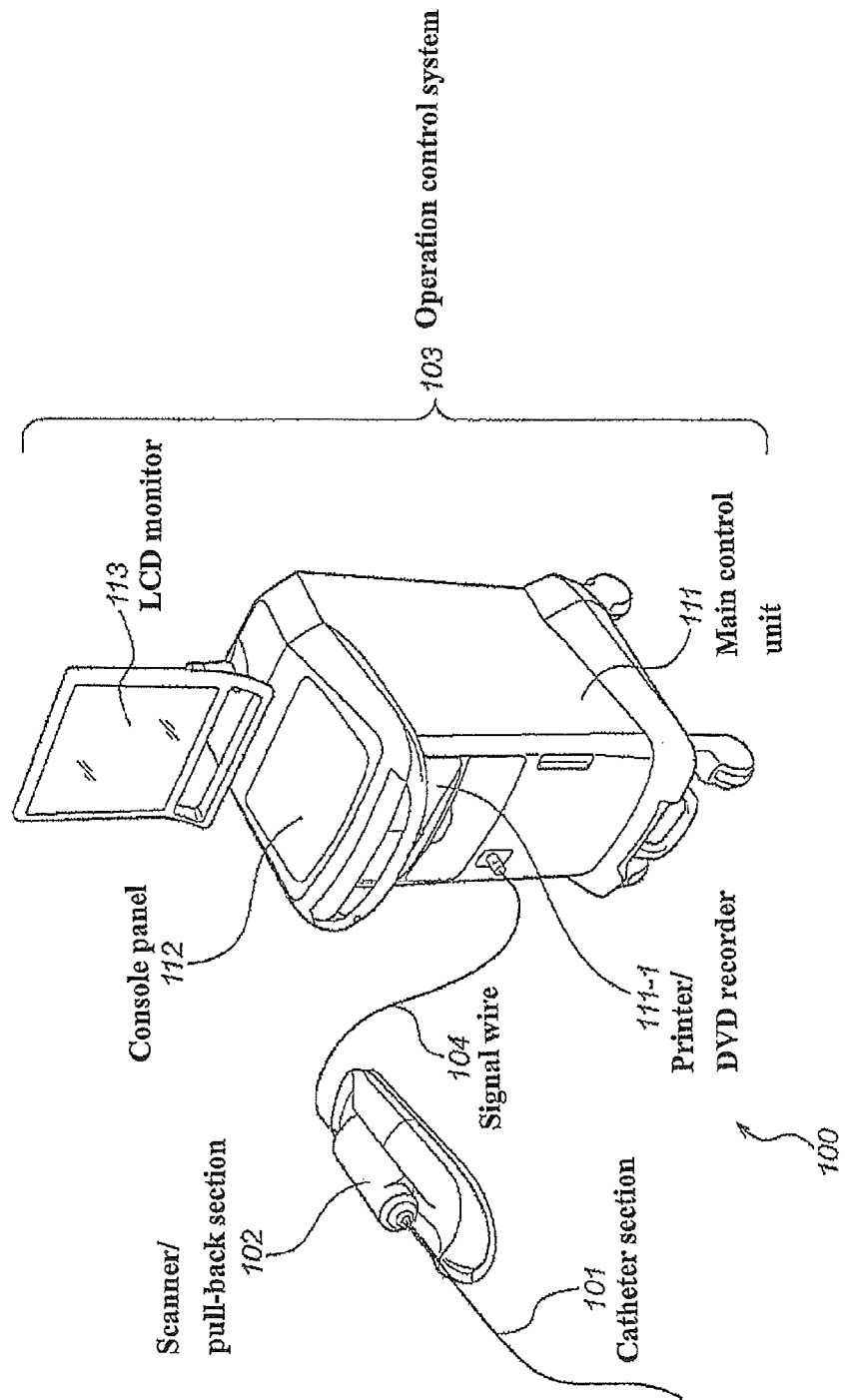
FIG. 1 illustrates features of an optical coherence tomography system.

FIG. 1 illustrates features of the optical coherence tomography system 100 to which the coupling device disclosed here is applied in the description which follows.

As shown in FIG. 1, the optical coherence tomography system 100 includes a catheter section 101 provided as a detachable optical probe, a scanner/pull-back section 102, and an operation control system 103, wherein the scanner/pull-back section 102 and the operation control system 103 are connected to each other by a signal wire 104.

Figure 2:
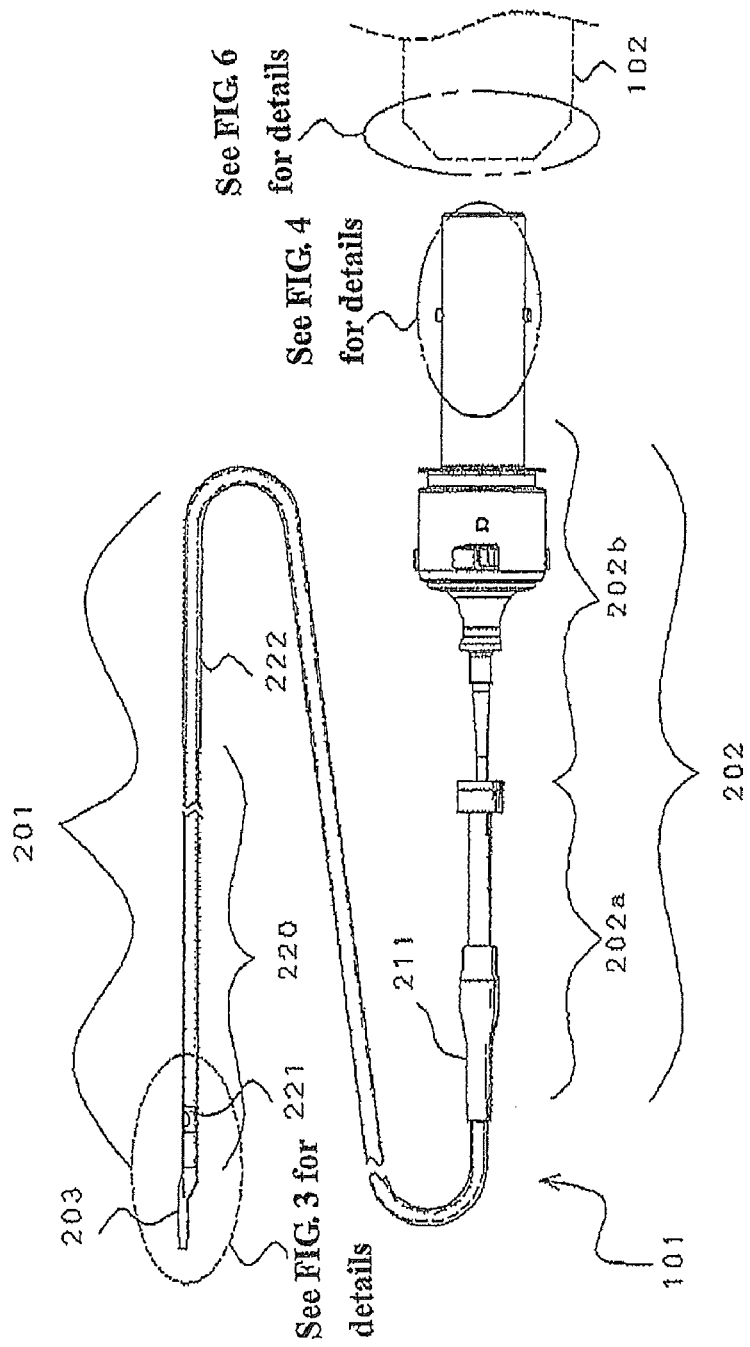
FIG. 2 illustrates the general configuration of a catheter section used in the system shown in FIG. 1.
Figure 3:
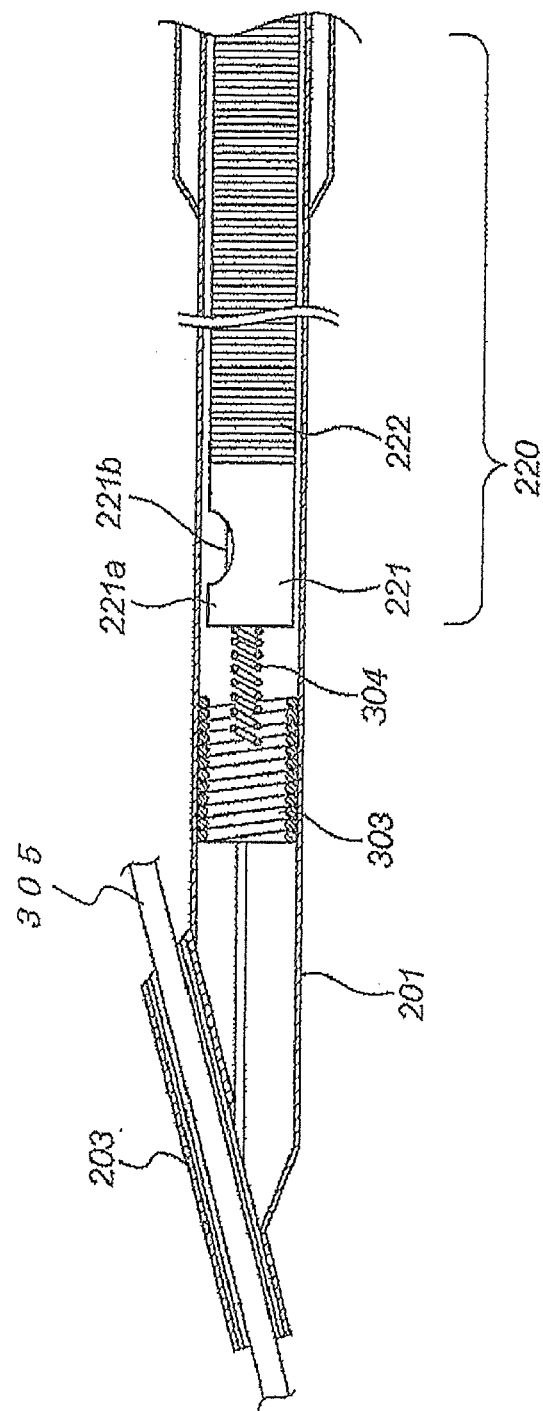
FIG. 3 is an enlarged longitudinal cross-sectional view of the distal portion of the catheter section.

The catheter section 101 is inserted directly into a blood vessel, for measurement of the state inside the blood vessel by use of low-coherence light radiated from an imaging core (see FIGS. 2 and 3). The scanner/pull-back section 102 performs radial scanning of the optical imaging core in the catheter section 101.

The operation control system 103 functions to input various set points in performing optical coherence tomography and process data obtained by measurement to thereby display a cross-sectional image.

The operation control system 103 includes a main control unit 111 which processes data obtained by measurement and outputs the results of that processing. The main control unit 111 includes a printer and DVD recorder 111-1, which performs operations such as printing the results of processing by the main control unit 111, and storing the results of processing as data.

The operation control system 103 includes a console panel 112 allowing the user to input various set points and a LCD monitor 113 which displays the results of processing by the main control unit 111.

2. Configuration of the Catheter Section 101

2.1 General Configuration of the Catheter Section 101

Referring to FIG. 2, the catheter section 101 includes an elongated catheter sheath 201 configured and sized to be inserted into a blood vessel, and a connector section 202 which is not inserted into the blood vessel but is disposed on the side of the user's hand (i.e., outside the body) to be operated by the user. The distal end of the catheter sheath 201 is provided with a tube 203 constituting a guide wire lumen. The catheter sheath 201 is formed as a lumen extending continuously from a part for coupling with the tube 203 to a part for coupling with the connector section 202, with details being illustrated in FIG. 3.

An imaging core 220 is in the lumen of the catheter sheath 201 and extends over substantially the whole length of the catheter sheath 201. The imaging core 220 includes a light transmission-reception section 221 for transmission and reception of measuring light, and a drive shaft 222 in which is provided an optical fiber cable. The drive shaft 222 transmits a driving force for rotating the optical fiber cable.

The connector section 202 includes a sheath connector 202a formed integrally with the proximal end of the catheter sheath 201, and a drive shaft connector 202b fixed to the proximal end of the drive shaft 222 to permit the drive shaft 222 to be rotated.

An anti-kinking protector 211 is provided at the boundary between the sheath connector 202a and the catheter sheath 201. This ensures that a predetermined rigidity is maintained, and bending (kinking) due to abrupt change in physical properties is inhibited, preferably prevented, from occurring.

Figure 4:
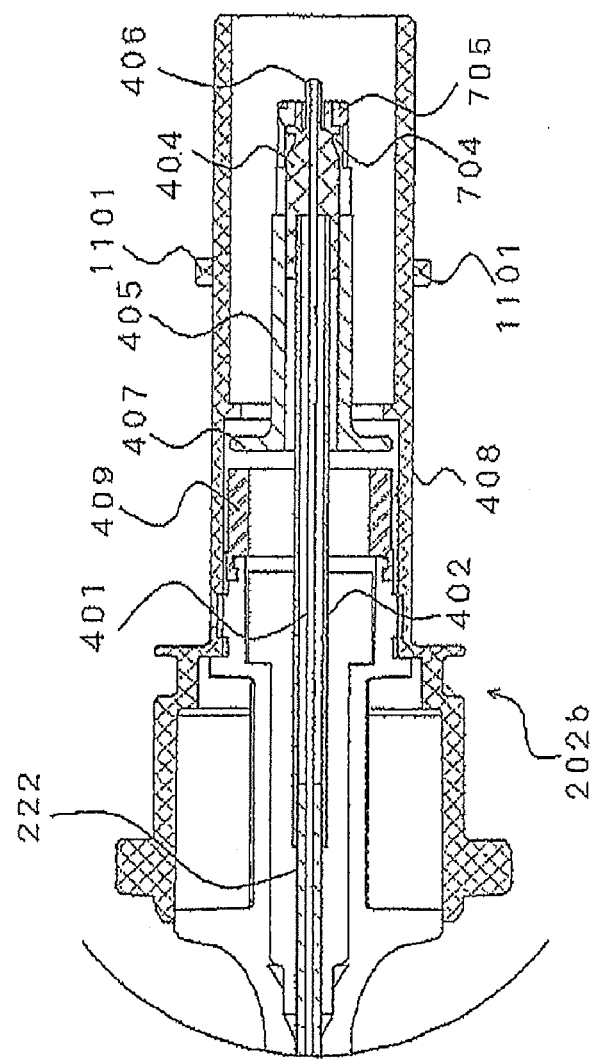
FIG. 4 is a longitudinal cross-sectional view of the drive shaft connector illustrating the interior of the drive shaft connector.
Figure 6:
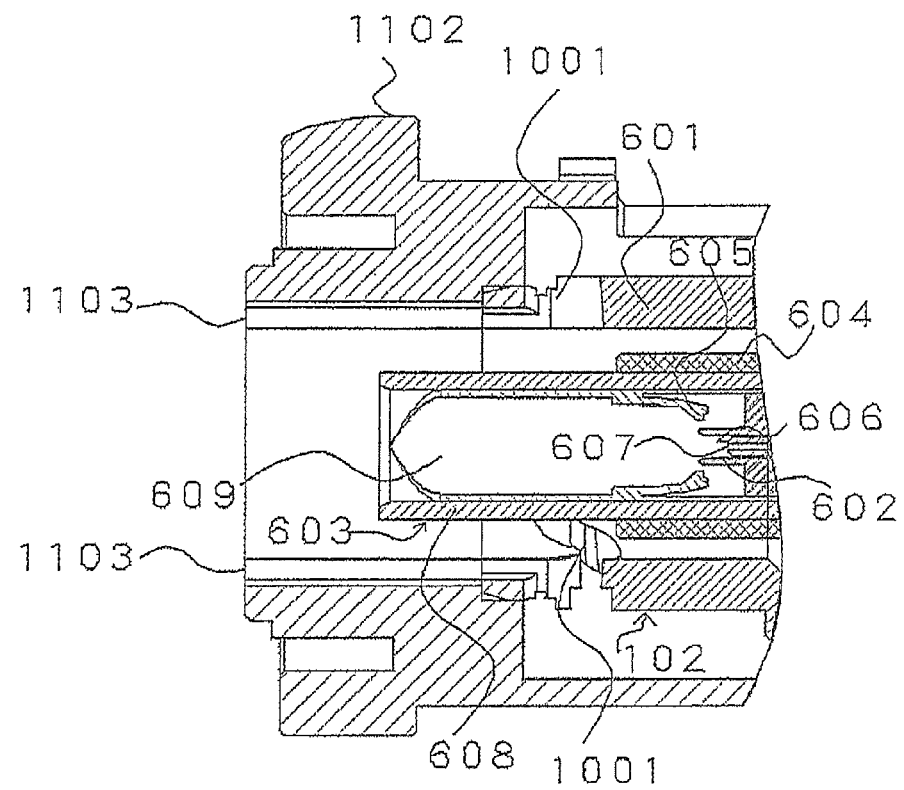
FIG. 6 is an enlarged cross-sectional view of the mounting part of the scanner/pull-back section (on the side for coupling with the proximal end of the drive shaft connector).

The proximal end of the drive shaft connector 202a (details of which are shown in FIG. 4) is configured to be connected to a mounting part of the scanner/pull-back section 102 (details of which are illustrated in FIG. 6) which will be described later. The coupling device in this disclosed embodiment is applied to coupling of optical fiber cables between the proximal end of the drive shaft connector 202 and the scanner/pull-back section 102).

2.2 Configuration of Distal Portion of Catheter Section 101

FIG. 3 illustrates the construction of the distal portion of the catheter section 101. This portion of the catheter section 101 is provided with the light transmission-reception section 221 which includes a prism or mirror 221b and a housing 221a for holding the prism or mirror 221b. Measuring light is radiated from the prism or mirror 221b toward tissue (living tissue) in a body cavity, and the reflected light from the tissue in the body cavity is received by the prism or mirror 221b.

The drive shaft 222 is coil-shaped, with an optical fiber cable disposed in the coil-shaped shaft and extending from the light transmission-reception section 221 to the connector section 202.

The inside of the housing 221a includes the light transmission-reception part 221b, and the housing 221a is connected to the drive shaft 222 on the proximal end side of the housing. In addition, a short coil-shaped elastic member 304 is provided at the tip end side of the housing 221a.

The elastic member 304 is a member formed by forming a stainless steel wire into a coil shape, and the stability of the imaging core 222 at the time of rotation is enhanced by the presence of the elastic member 304 disposed on the tip end side.

A radiopaque coil 303 is provided for confirming, under radioscopy, the position of the distal portion of the catheter sheath 201 in a living body.

The tube 203 defines a hole in which a guide wire 305 is insertable. The guide wire 305 is preliminarily inserted in a body cavity, and is used for guiding the catheter sheath 201 to a diseased part.

The drive shaft 222 is capable of rotation and sliding relative to the catheter sheath 201, and is composed of a member which is flexible and has a property of being able to transmit rotation in a favorable manner, for example, a solid-coiled multilayer coil formed from a metallic wire of stainless steel or the like.

2.3 Configuration of the Drive Shaft Connector 202b

Referring to FIG. 4 which illustrates the inside of the proximal end of the drive shaft connector 202b, a connector (second coupling terminal) 404 for optical fiber is disposed at the proximal end of the drive shaft connector 202b, whereby an optical fiber cable 401 is connected to an optical fiber cable in the scanner/pull-back section 102.

At the time of coupling with a first coupling terminal (described later), a connector fixing member 405 cooperates with a first fixing member in aligning the connector 404 in the circumferential direction. In the present embodiment, for convenience, a terminal on the catheter section side is referred to as "connector" and a terminal on the other side is referred to as "adapter." In the following description, the connector 404 and a connector fixing member 405 are together referred to as a connector device.

The connector 404 for optical fiber is joined to the drive shaft 222 through a coupling pipe 402. In addition, the connector 404 is disposed inside the connector fixing member (second fixing member) 405 which possesses a hollow cylindrical shape, and holds and fixes an end portion of the optical fiber cable 401. The tip end of the optical fiber cable 401 is provided with a ferrule 406. The end portion of the optical fiber cable 401 is processed into an APC type formed with an inclination angle to the direction of light, for preventing generation of noise due to reflection of light on the end face. The connector fixing member 405 has a disk-shaped flange 407 at an end portion corresponding to the distal side of the catheter sheath 201 (at an end portion on the side opposite the adapter side), and is rotatably held inside the housing (second housing) 408 of the drive shaft connector 202b.

In addition, an elastic member 409 is provided inside the housing 408 at such a position near the flange 407 that it can contact the flange 407, and, at the time of coupling with the adapter (described later), the elastic member 409 presses the flange 407, whereby coupling of the optical fiber cables is facilitated. After the coupling of the optical fiber cables, the elastic member 409 is not in contact with the flange 407, so that damage or deformation of inside members can be inhibited or prevented from occurring during internal drive. The elastic member 409 can be composed of a synthetic rubber or metallic spring. A material with relatively low tackiness, such as silicone rubber, is particularly preferable as the material for the elastic member 409.

The outer surface of the housing 408 is provided with a pair of radially outwardly extending projections 1101.

2.4 Configuration of Optical Fiber Cable 401

Figure 5:
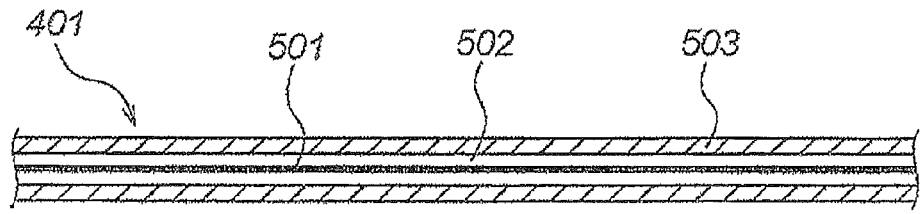
FIG. 5 is a partial cross-sectional view illustrating the configuration of an optical fiber.

FIG. 5 illustrates the general configuration of a single-mode optical fiber cable. The optical fiber cable 401 is comprised of a core 501 for transmitting light, and a clad 502 slightly lower in refractive index than the core 501. Light is transmitted through repeated total reflection on the boundary surface between the core 501 and the clad 502, only in the case where the angle of incidence is larger than a critical angle. In addition, the outer surface of the clad 502 of the optical fiber 401 is covered with a resin material called a jacket 503 so that even in the case where the optical fiber 401 is bent at a large curvature, stress will be dispersed and the optical fiber cable 401 is inhibited or prevented from breaking.

3. Inside Configuration of Scanner/Pull-Back Section 102

FIG. 6 illustrates the inside configuration of the mounting part of the scanner/pull-back section 102, on the side that couples with the proximal end of the drive shaft connector 202b. An adapter device is provided inside the mounting part, and the adapter device includes a housing (first housing) 601. The housing 601 is hollow and thus includes possesses an interior. The housing 601 is fixed inside a head 1102 constituting an outer surface of the mounting part. A housing 408 of the drive shaft connector 202b is positioned in and fitted to the inner surface of the housing 601 when the connectors are connected. The housing 408 is provided with a pair of grooves 1001 which are continuous with groove inlets 1103 of the head 1102 and into which the pair of projections 1101 of the housing 408 can be received.

An adapter (first coupling terminal) 602 is configured to be coupled to the connector 404, and the adapter 602 is held so as to be rotatable relative to the housing 601. An adapter fixing member (first fixing member) 603 possesses a hollow cylindrical shape in which the adapter 602 is fixed as to be incapable of relative rotation (i.e., rotationally fixed). The adapted fixing member 603 is positioned in the interior of the housing 601. At the time of coupling with the connector 404, the adapter fixing member 603 cooperates with the connector fixing member 405 to align the connector 404 in the circumferential direction. The adapter fixing member 603 is joined to a driving force relay pipe 604 which relays or transmits the driving force of a rotational driving part (motor). This helps ensure that, after coupling with the connector 404, rotational drive of the driving force relay pipe 604 is transmitted to the drive shaft 222.

The inner surface of the adapter fixing member 603 includes a pair of claws 605. The pair of claws 605 is engageable with the connector 404, thereby firmly uniting the connector 404 with the adapter 602. The adapter 602 is formed with a hole 606 of a female type structure for receiving the ferrule 406 of the connector 404, and an optical fiber end portion 607 processed into the APC type is positioned in the hole 606.

In addition, the adapter fixing member 603 is composed of a protective tube 608 defining an outer surface of the adapter fixing member 603, and a guide tube 609 fixed to the inner surface of the protective tube 608 and defining the inner surface of the adapter fixing member 603.

In the following description, the housing 601 and the adapter 602 and the adapter fixing member 603 will together be referred to as adapter device. The coupling device is thus composed of the connector device and the adapter device.

4. Configuration of Coupling Device 4.1 Configuration of Connector Device

FIGS. 7(a)-7(d) illustrate the configuration and features of the connector device, where FIG. 7(a) is a front view, FIG. 7(b) is a top plan view, FIG. 7(c) is a side view, and FIG. 7(d) is a perspective view.

As shown in FIGS. 7(a) and 7(c), the connector device includes the connector fixing member 405 having a hollow cylindrical shape, and the connector 404 disposed inside the connector fixing member 405. The ferrule 406 is formed at the end portion of the connector 404.

In addition, as shown in FIGS. 7(a) to (d), the outer peripheral surface of the connector fixing member 405 is provided with a projection 702 extending in the longitudinal direction. The projection is circumferentially limited, meaning the projection 702 extends over less then an entire circumferential portion of the connector fixing member 405 and extends over less than the entire longitudinal extent of the connector fixing member 405. A proximal-side end portion of the projection 702 is pointed end portion for reducing contact resistance at the time of contact with the end face of the adapter fixing member 603 which will be described later. The connector fixing member 405 has an outside diameter R so determined that when the connector fixing member 405 is inserted in the hollow part of the adapter fixing member 603, the outer peripheral surface of the connector fixing member 405 slides relative to the inner wall surface of the adapter fixing member 603.

The outer peripheral surface of the connector fixing member 405 is formed, at positions for avoiding interference with the projection 702, with a pair of slits 703 in left-right symmetry. Side surfaces of the connector 404 are exposed in the inside of the slits 703, and the connector fixing member 405 is provided with projections 704 to engage the claws 605 of the adapter fixing member 603.

When the connector 404 and the adapter 602 and the adapter fixing member 603 are united by the claws 605 and the projections 704, the connector fixing member 405 is not taking part in the coupling between them, and the connector fixing member 405 can be slid to some extent forward and backward along the axial direction. To detach the connector 404 and the adapter 602 thus connected together, the user grips the housing 408 of the drive shaft connector 202b and pulls it out, whereon the connector fixing member 405 is slid in the pulling-out direction through the flange 407. In this case, round projections 705 formed at proximal end portions of the slits 703 push open the claws 605 to disengage the claws 605 from the projections 704, thereby enabling the connector 404 to be pulled out of the adapter 602.

4.2 Adapter Device

FIG. 8 illustrates the configuration of the guide tube 609 of the adapter device, in which FIG. 8(a) is a top plan view, FIG. 8(b) is a side view, and FIG. 8(c) is a front view.

As above-mentioned, the adapter device has the adapter fixing member 603 having a hollow cylindrical shape, and the adapter 602 and the housing 601 which are fixed inside the adapter fixing member 603. While the adapter fixing member 603 is composed of the protective tube 608 and the guide tube 609, only the guide tube 609 is shown in FIGS. 8(a)-(c) for description of the structure of the guide tube 609. The protective tube 608 is provided for the purpose of covering the sharp tip of the guide tube 609, thereby preventing injury of the user or breakage of the connector 404, and for guiding the insertion of the fixing member 405 into the guide tube 609. The protective tube 608 and the guide tube 609 may be molded together as one body. As shown in FIG. 8, the guide tube 609 is provided on its open side with end faces 801A and 801B which are inclined end faces.

In addition, as shown in FIG. 8(a), the end faces 801A and 801B of the guide tube 609 are partly provided with a notch 802 extending in the longitudinal direction (the axial direction of the hollow part) of the adapter fixing member 603. The notch 802 has a width w in the circumferential direction which is so designed that the projection 702 of the connector fixing member 405 is fitted in the notch 802.

As shown in FIG. 8(a), the end face 801A is an end face extending clockwise, along the circumferential direction, starting from the notch 802, whereas the end face 801B is an end face extending counterclockwise. The end face 801A and the end face 801B intersect each other at a position circumferentially spaced by 180 degrees from the notch 802 (the position will hereinafter be referred to as the vertex). The end face 801A and the end face 801B are symmetrical with each other, the center of symmetry being a plane on which the notch 802 and the vertex are located.

In addition, the end face 801A has an outer wall boundary line 801A-1 as the boundary between itself and the outer wall, and an inner wall boundary line 801A-2 as the boundary between itself and the inner wall. Similarly, the end face 801B has an outer wall boundary line 801B-1 as the boundary between itself and the outer wall, and an inner wall boundary line 801B-2 as the boundary between itself and the inner wall.

The outer wall boundary line 801A-1 extends circumferentially clockwise by 180 degrees in a helical shape starting from the notch 802, to intersect the outer wall boundary line

801B-1 at the vertex. Similarly, the outer wall boundary line 801B-1 extends circumferentially counterclockwise by 180 degrees in a helical shape starting from the notch 802, to intersect the outer wall boundary line 801A-1 at the vertex.

The inner wall boundary line 801A-2 extends circumferentially clockwise by 180 degrees in a helical shape starting from the notch 802, to intersect the inner wall boundary line 801B-2 at the vertex. Similarly, the inner wall boundary line 801B-2 extends circumferentially counterclockwise by 180 degrees in a helical shape starting from the notch 802, to intersect the inner wall boundary line 801A-2 at the vertex. In this case, the outer wall boundary lines and the inner wall boundary lines are equal in helical pitch.

4.3 Operation at the Time of Coupling

FIGS. 9(*a*)-(*d*) illustrate operations of the connector fixing member 405 and the adapter fixing member 603 at the time of coupling of the coupling device. In FIG. 9, the drive shaft connector 202*b* and the housing 601 and the protective tube 608 are omitted, for convenience of description. As shown in FIG. 9(*a*), at the time of coupling, first, with the drive shaft connector 202*b* gripped, a tip end portion of the connector fixing member 405 is inserted into the hollow part of the adapter fixing member 603 at an arbitrary circumferential or rotational orientation.

As the connector fixing member 405 is pushed further in the insertion or axial direction indicated by the arrow in FIG. 9(*a*), the projection 702 of the connector fixing member 405 and the end face 801B of the adapter fixing member 603 come into contact with each other as shown in FIG. 9(*b*). With the connector fixing member 405 urged further in the insertion direction, the projection 702 slides along the end face in the direction of arrow 901.

The sliding of the projection 702 along the end face in the direction of the arrow 901 results in that the connector fixing member 405 is rotated inside the drive shaft connector 202*b* (not shown) in the circumferential direction (see (c)).

With the connector fixing member 405 pushed further in the insertion direction, the connector fixing member 405 is rotated further. When the projection 702 soon reaches the position of the notch 802, the projection 702 moves into the notch 802. In short, simply pushing the connector fixing member 405 towards the adapter fixing member 603 causes the projection 702 to be guided into the notch 802). Then, with the connector fixing member 405 pushed further in, the projection 702 is inserted straight along the notch 802, whereby the adapter 602 and the connector 404 are connected to each other. In other words, the fitting of the tip end of the projection 702 into the notch 802 restricts the movement of the connector fixing member 405 in the circumferential direction (or, completes the alignment in the circumferential direction), and the insertion of the projection 702 along the notch 802 realizes the coupling between the adapter 602 and the connector 404. Thus, in this disclosed embodiment, as the connector fixing member 405 is initially moved towards the adapter fixing member 603, the connector fixing member 405 rotates relative to the adapter fixing member 603 and moves axially relative to the adapter fixing member 603. When the projection 702 enters the notch 802, the rotational movement of the connector fixing member 405 relative to the adapter fixing member 603 stops, and the connector fixing member 405 moves only axially/longitudinally relative to the adapter fixing member 603.

Thus, even without strict alignment of the connector 404 in the circumferential direction, if only the tip end of the connector fixing member 405 is inserted into the hollow part of the adapter fixing member 603, the further insertion of the connector fixing member 405 is automatically performed by the guiding of the projection 702 toward the notch 802, whereby the desired alignment of the connector fixing member 405 in the circumferential or rotational direction is completed.

As a result, in the coupling device for coupling optical fiber cables, the alignment in the circumferential or rotational direction for coupling the connectors to each other can be carried out relatively easily. Specifically, the user is required only to move the housing 408 of the drive shaft connector 202*b* rectilinearly in the insertion direction, whereby the alignment of the connector fixing member 405 in the circumferential or rotational direction is automatically carried out, and the desired alignment is completed.

FIG. 10 illustrates the housing 601 as a component inside the head 1102 of the mounting part, in which FIG. 10(*a*) is a top plan view and FIG. 10(*b*) is a perspective view. The outer surface of the housing 601 is provided with a pair of grooves 1001 at positions symmetrical about the axis of the tubular body. The projections 1101 (described later) provided on the housing 408 of the connector device are fitted into the two grooves 1001 through groove inlets 1002, respectively.

The groove 1001 is so configured that when the connector fixing member 405 is inserted into the adapter fixing member 603, the projection 1101 is inserted into the groove 1001. Then, with the connector fixing member 405 further urged in the insertion direction, the projection 1101 slides along the groove 1001, and the projection is stopped upon reaching the terminal end of the groove 1001 after a returning motion in a direction reverse to the insertion direction, whereby the coupling between the adapter 602 and the connector 404 is realized. Specifically, the groove 1001 is so configured that the projection 1101 proceeds in a rotating direction perpendicular to the insertion direction, after making a U-turn from the insertion direction. While the groove 1001 in the present embodiment is not penetrating in the region of the groove inlet 1002 but is penetrating in the depth region, this configuration is not limitative.

FIGS. 11 and 12 show the connector device and of the adapter device covered by the head 1102, and FIG. 13 illustrates the manner in which the connector section 202 and the adapter device (head 1102) are brought towards each other to be connected to each other.

As shown in FIGS. 11 to 13, the housing 408 of the connector device is provided with the projection 1101, and the housing 601 of the adapter device is disposed inside the head 1102 of the adapter device. The groove inlet 1103 is continuous with (communicates with) the groove 1001 of the housing 601 and is provided in an inlet portion of the head 1102. Specifically, when the head 1102 and the housing 408 of the connector device are fitted to each other, the groove inlet 1103 disposed at the head 1102 and the projection 1101 at the housing 408 of the connector device are located at the same place in the circumferential or rotational direction. This correct rotational/circumferential positioning is achieved due to the fitting of the projection 702 in the notch 802.

The coupling between the connector device and the adapter device will be described with reference to FIGS. 14 to 16. In each of FIGS. 14 to 16, (a) shows a condition where the projections 1101 of the housing 408 of the connector device are positioned in the grooves 1001 of the adapter device housing 601, and (b) illustrates the elastic member when the projections 1101 of the connector device housing 408 are inserted in the grooves 1001 of the adapter device housing 601. The head 1102 is omitted in the drawings, for easier understanding. As shown in FIG. 14(*a*) and FIG. 14(*b*), at the time of coupling, first the projections 1101 are inserted into the grooves 1001. Next, as shown in FIG. 15(*a*), the housing 408 of the connector device is slid further in the insertion direction, and when the projections 1101 are located in the deepest portions of the grooves 1001, the disk-shaped flange 407 presses the elastic member 409 to compress the elastic member 409 as shown in FIG. 15(b). In this regard, the end of the elastic member 409 which faces away from the flange 407 contacts a fixed part (stop) that prevents the elastic member from moving away from the flange 407 when the flange 407 contacts the elastic member 408. This thus causes the elastic member 409 to compress when contacted by the flange 407. In this instance, an optical fiber connector of the connector device and an optical fiber end portion on the adapter device side are connected to each other. When the projections 1101 are further slid along the grooves 1001 as shown in FIG. 16(a), the projections 1101 proceed in a rotating direction perpendicular to the insertion direction, and stop at terminal ends of the grooves 1001. At this time, the disk-shaped flange 407 and the elastic member 409 are spaced from each other an no longer in contact with one another as shown in FIG. 16(b). The disk-shaped flange 407 thus moves from a non-contacting position relative to the elastic member 409 as the projections 1101 enter the grooves 1001 (FIG. 14(b)), to a position in contact with and compressing the elastic member 409 as the projections 1101 enter the deepest portions of the grooves 1001 (FIG. 15(b)), and then to a non-contacting position relative to the elastic member 409 as the projections 1101 reach the terminal ends of the grooves 1001 (FIG. 16(b)).

Thus, according to the coupling device in the present embodiment, the optical fiber connectors are firmly connected to each other by the elastic force of the elastic member 409, and the connector device and the adapter device are fitted to each other, so that the couplings of both the pairs to be connected are carried out simultaneously. Here, the elastic member 409 functions as a pusher while being compressed. The optical fiber connectors can thus be inhibited or prevented from being damaged due to excessive pushing-in, and defective coupling of the optical fiber connectors can be inhibited or prevented from occurring due to insufficient pushing-in. In addition, after the elastic member 409 connects the optical fiber connectors, the connector device is slightly moved away from the adapter device so that the elastic member 409 functioning as a pusher is separated from the flange 407 serving as a rotatable element. Therefore, even in the case where the rotatable element is rotated at a relatively high speed, damage due to contact of the rotatable element with non-rotated members is avoided. Accordingly, coupling of the connectors for optical fibers can be carried out relatively easily.

EXAMPLE 2

FIG. 17 is a view showing a connector device according to a second embodiment of the coupling device disclosed here. As shown in FIG. 17, in this second embodiment, an elastic member 409 for pressing a disk-shaped flange 407 at the time of coupling between optical fiber cables is composed of a metallic coil spring 1701. An end portion of the coil spring 1701 is provided with a cylindrical pusher 1702. The pusher 1702 presses the disk-shaped flange 407, whereby optical fibers are connected to each other. The material for forming the coil spring 1701 may be any material that can exhibit elasticity.

The principles, preferred embodiments and other disclosed aspects have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An optical imaging device comprising:
an optical probe, with an optical fiber rotatably incorporated in the optical probe;
a controller which has a light source and which sends and receives a signal to and from the optical probe; and
a coupling device connecting the optical probe and the controller to each other;
the coupling device comprising:
an adapter device comprised of a first fixing member and a first coupling terminal disposed inside the first fixing member, the first fixing member having a hollow part opened at one end;
a connector device comprised of a second fixing member and a second coupling terminal disposed inside the second fixing member, the second terminal being connected to the optical fiber, the second fixing member being insertable into the first fixing member to couple together the first coupling terminal and the second coupling terminal, the second fixing member possessing an outer wall slidable along an inner wall of the first fixing member when the second fixing member is inserted into the first fixing member;
the adapter device also including a housing provided with at least one curved groove;
the connector device also including a housing provided with at least one projection;
an elastic member in the second fixing member on a proximal end side of the second fixing member; and
the groove possessing a shape which, when the second fixing member is inserted into the first fixing member in an insertion direction and the projection enters the groove, causes the projection to slide along the groove until reaching a stopped position in which movement of the projection is stopped following movement of the projection in a direction reverse to the insertion direction, with the first coupling terminal and the second coupling terminal connected to each other when the projection reaches the stopped position.

2. The optical imaging device according to claim 1, wherein the adapter device is a mounting part of a scanner/pull-back section.

3. The optical imaging device according to claim 2, wherein the first coupling terminal is connected to an optical fiber in the scanner/pull-back unit.

4. An optical fiber coupling device comprising:
a first optical fiber;
a first housing surrounding a first fixing member, the first fixing member possessing an inner wall surface surrounding a first coupling terminal and possessing a hollow part open at one end, the first optical fiber being connected to first coupling terminal;
a second optical fiber;
a second housing surrounding a second fixing member, the second housing possessing an outer wall surface, the second fixing member being insertable into the first fixing member, the second fixing member surrounding a second coupling terminal, the second fixing member possessing an outer wall surface slidable along the inner wall surface of the first fixing member when the second fixing member is inserted into the first fixing member, the second optical fiber being connected to the second coupling terminal;

the first housing including at least one curved groove which is open at a groove inlet at one end of the first housing, the second housing including at least one projection extending outwardly from the outer wall surface of the second housing;

an elastic member positioned in the second housing proximally of the second fixing member;

the groove receiving the projection on the outer wall surface of the second housing by way of the groove inlet when the second fixing member is moved in an insertion direction and is inserted into the first fixing member;

the groove possessing a configuration that guides the projection when the second fixing member is further moved in the insertion direction so the projection moves in the insertion direction, subsequently moves in a direction reverse to the insertion direction after the projection reaches a deepest part of the groove, and subsequently stops at a stopped position when the projection reaches a terminal end of the groove, whereby the first coupling terminal and the second coupling terminal are connected to each other when the projection reaches the terminal end of the groove; and the elastic member being configured so that the elastic member is compressed when the projection is positioned between the groove inlet and the deepest part of the groove.

5. The coupling device according to claim 4, wherein the second fixing member includes a cylindrical portion and a disk-shaped flange at one end of the cylindrical portion, and with the projection positioned between the groove inlet and the deepest part of the groove, the disk-shaped flange contacts the elastic member and compresses the elastic member.

6. The coupling device according to claim 5, wherein the groove is configured such that when the projection reaches the terminal end of the groove after the coupling of the first coupling terminal and the second coupling terminal, the disk-shaped flange is not in contact with the elastic member.

7. The coupling device according to claim 4, wherein the groove possesses a configuration which causes the projection moving along the groove to rotate in a rotating direction perpendicular to the insertion direction after reaching the deepest part of the groove.

8. The coupling device according to claim 4, wherein the elastic member is a resin or metallic member.

9. A coupling device for coupling optical fiber cables comprising:

an adapter device comprised of a first fixing member and a first coupling terminal disposed inside the first fixing member, the first fixing member having a hollow part opened at one end;

a connector device comprised of a second fixing member and a second coupling terminal disposed inside the second fixing member, the second fixing member being insertable into the first fixing member to couple together the first coupling terminal and the second coupling terminal, the second fixing member possessing an outer wall slidable along an inner wall of the first fixing member when the second fixing member is inserted into the first fixing member;

the adapter device also including a housing provided with at least one curved groove;

the connector device also including a housing provided with at least one projection;

an elastic member in the second fixing member on a proximal end side of the second fixing member; and the groove possessing a shape which, when the second fixing member is inserted into the first fixing member in an insertion direction and the projection enters the groove, causes the projection to slide along the groove until reaching a stopped position in which movement of the projection is stopped following movement of the projection in a direction reverse to the insertion direction, with the first coupling terminal and the second coupling terminal connected to each other when the projection reaches the stopped position.

10. The coupling device according to claim 9, wherein the second fixing member includes a cylindrical portion and a disk-shaped flange at one end of the cylindrical portion, and with the projection moving in the groove in the insertion direction the disk-shaped flange contacts the elastic member and compresses the elastic member.

11. The coupling device according to claim 10, wherein the groove is configured such that when the projection reaches the stopped position after the coupling of the first coupling terminal and the second coupling terminal, the disk-shaped flange is not in contact with the elastic member.

12. The coupling device according to claim 9, wherein the groove possesses a configuration which causes the projection moving along the groove to rotate in a rotating direction perpendicular to the insertion direction after when moving in the direction reverse to the insertion direction.

13. The coupling device according to claim 9, wherein the elastic member is a resin or metallic member.

14. The coupling device according to claim 9, wherein the adapter device includes a protective tube covering a pointed tip of a guide tube which is positioned in the protective tube, the second fixing member including a projection on an outer surface of the second fixing member, the projection on the outer surface of the second fixing member contacting and being guided by the guide tube into a groove on the guide tube, the groove being positioned diametrically opposite the pointed tip.

* * * * *